Figure 1:
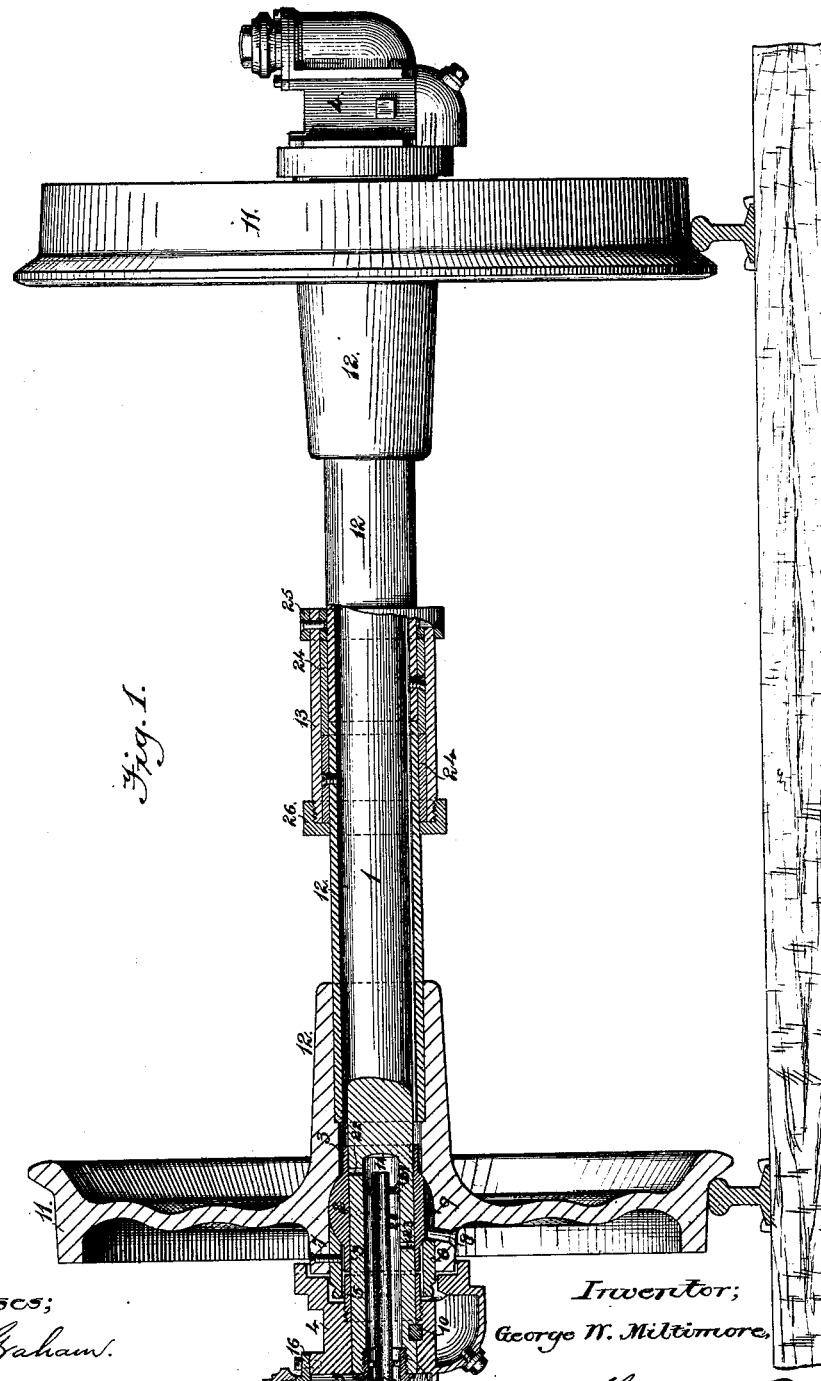

2 Sheets—Sheet 1.

G. W. MILTIMORE.
Car-Axle.

No. 200,746. Patented Feb. 26, 1878.

Witnesses:
Geo. H. Graham.
H. S. Munson.

Inventor:
George W. Miltimore,
by Munson & Philipp
Attorneys.

N. PETERS, PHOTO-LITHOGRAPHER, WASHINGTON, D C.

2 Sheets—Sheet 2.

G. W. MILTIMORE.
Car-Axle.

No. 200,746. Patented Feb. 26, 1878.

Witnesses,  Inventor;

Geo. H. Graham.
H. S. Munson

George W. Miltimore, by Munson & Philipp
Attorneys.

UNITED STATES PATENT OFFICE.

GEORGE W. MILTIMORE, OF NEW YORK, N. Y.

IMPROVEMENT IN CAR-AXLES.

Specification forming part of Letters Patent No. 200,746, dated February 26, 1878; application filed August 16, 1877.

*To all whom it may concern:*

Be it known that I, GEORGE W. MILTIMORE, of the city, county, and State of New York, have invented certain new and useful Improvements in Car-Axles; and I do hereby declare the following to be a full, clear, and exact description of the same, reference being had to the accompanying drawings, forming a part of this specification.

In the ordinary and almost universal construction of cars for railroads the axle is made in one piece, and the wheels are secured rigidly thereto. Great wear and loss, both to the axle, its wheels, and the rails of the road, result from this construction. This is caused by one wheel, in going around curves, traveling a greater distance than the other, which latter must slip, thus grinding and wearing itself and its rail away, and, by retarding the free movement of the axle, causes a torsional strain, which, in a short time, by the movements of the metal fibers of said axle, destroys the same. Power is also wasted in overcoming this slipping and torsional strain. This wear of the wheels, the rails, the destruction of the axle by torsional strain, and the waste of power, is augmented when one wheel is of greater diameter than its companion on the same axle, as is often the case.

Efforts have been made to overcome the great loss incident to this construction of axles and wheels by making the axles and wheels so that the latter may revolve independently of the former and of each other. In this latter construction it was found necessary to make the axle stationary. Many difficulties were met with when this was done, owing to the spring of the axle near its center, caused by the load of the car, which was outside of the wheels, to the lateral motion or thrust of the axle, and to the friction of the bearing-surfaces and their insufficient lubrication.

The object of my invention is to obviate the above-named difficulties incident to the use of a stationary axle; and it consists, first, in providing a bearing for the wheels at or near a point midway between them and independent of the stationary axle; secondly, in controlling the lateral motion or thrust of the axle by annular projections on the axle-box and the pedestal-support; thirdly, in means for properly lubricating the bearings; fourthly, in details of construction—all of which subdivisions of my invention will now be particularly described and clearly claimed.

Figure 2:
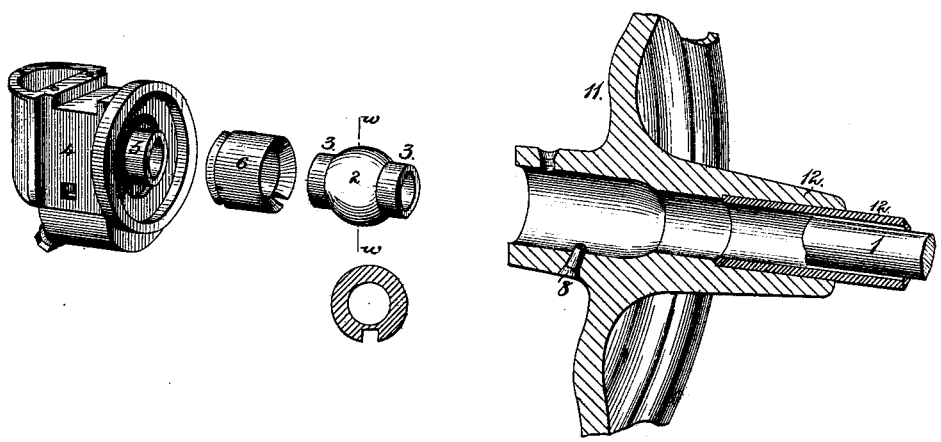
Figure 3:
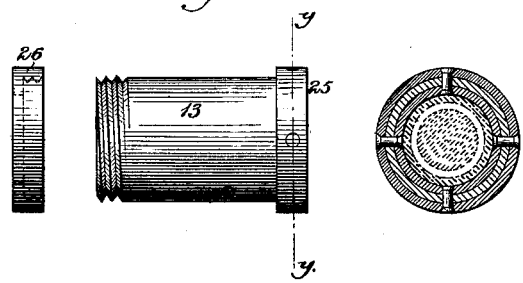
Figure 4:
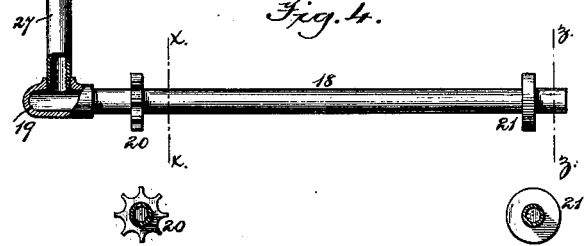
Figure 4:

In the drawings, Figure 1 is a view, partly in plan and partly in section, of a car-axle containing my invention. Fig. 2 is a perspective view of various parts of the same. Fig. 3 is a view, partly in plan and partly in section, of means for forming the independent bearing for the wheels. Fig. 4 shows portions of the lubricating devices in detail.

Referring to these figures, 1 represents the axle, of proper size and strength to sustain the load of the car. The ends of this axle fit within the pedestal-supports 4, and are rigidly secured to the same by keys 10 fitting in grooves in the axle and pedestal-supports, as shown.

In practice, the jaws of the car-truck embrace the pedestal-block and confine both ends of the keys 10; but said keys may be prevented from being jarred or otherwise made loose by a jam-screw or other well-known device for this purpose.

On each end of the axle is a box, 2, made convex about its middle, which convex portion is seated in a cavity having a corresponding concave portion in the wheel 11, and is caused to move with the latter by means of a pin, 8, secured to the wheel, and a groove, 9, in the box in which its projecting end rests.

The box 2 is kept snugly in contact with its seat in the wheel 11 by a ring, 6, which has bearings in the cavity of the wheel, and is held rigidly in position, with its inner concave portion resting against the convex portion of the box 2 by means of a screw, 7, or other suitable device.

The box 2 is provided with annular projections or ends 3, the exterior diameter of which is less than the interior diameter of the ring 6, or the cavity of the wheel beyond the box bearing or seat. By this construction the box 2 is allowed to move or oscillate if the weight of the car should cause the axle 1 to spring, and always keeps its full journal-surface in contact with the portion of the axle it embraces.

The pedestal-support 4 is provided with an annular projection, 5, against which one projection or end, 3, of the box 2 abuts and runs in contact. These two annular projections, in connection with their corresponding parts on the companion-wheel and pedestal-support, control the lateral motion of the axle, thus resisting the lateral thrust of the car.

The box 2 may be reversed when one annular projection, 3, has been worn away, so that the other projection may be used.

Although this is the most economical construction known to me, yet I do not confine myself to it in carrying out my invention.

Each wheel 11 is provided with an outer axle or sleeve, 12. As shown in the drawing, this is made partly of cast-iron and partly of wrought-iron or steel united together, and this is the preferable construction; but it can be made in one piece with the wheel, and of any suitable material.

To the sleeve 12 of each wheel may be secured, by rivets or other suitable means, a collar, 24, on the sleeve of one wheel a short distance from its end, and on the sleeve of the companion-wheel, so that a small portion may extend over its end, whereby, when the ends of the two sleeves are brought together the collar of the one will lap over the end of the other and abut against the collar of the other to break joints. This is the form I prefer to use; but it would be practicable to have the collars flush with the ends of the sleeves and abut.

A tube, 13, surrounds the collars 24, fitting snugly over them, so that they may revolve within the same. The width of the collars 24 and the length of the tube 13 should be just sufficient to afford the proper bearing-surface for the load of the car on the wheels when they turn independently of each other.

To assist in making the joint between the ends of the sleeves 12, and insuring the parallelism of the bearing-surfaces of the collars 24 and the tube 13, I provide the latter at one end with a projecting flange, 25, which embraces one sleeve, 12, and bears against the end of its collar 24. The other end of said tube 13 has a nut, 26, screwed thereto, the projecting flange of which embraces the sleeve 12, and bears against the end of its collar 24 adjacent thereto. When the nut is forced against the end of the tube 13, the collars 24 and sleeves 12 can just turn snugly without any lateral motion. The exterior of the collars and interior of the tube, together with the inner portion of the flange 25, and that on the nut 26, are turned or properly finished to form smooth bearing-surfaces.

In some cases the collars 24, nut 26, and flange 25 may be dispensed with, the ends and a portion of the sleeves 12 being finished and the tube 13 made to snugly fit over them, being held in position by collars on the sleeves or other suitable devices; or the nut 26 and flange 25 may be omitted, and other devices substituted to perform the same function without departing from my invention.

By the construction just described, the wheels 11 can turn independently of each other and of the axle, and their bearing-surfaces, when they do so turn, are about midway between the wheels at the points where the minimum of pressure is exerted by the load of the car, thus diminishing the friction and consequent wear in so turning.

The oil-reservoir 15 in the pedestal-support 4 is covered by a plate, 16, provided with a screw-cap, 17. The axle 1 is provided with a recess at each end. In this recess a pipe, 18, smaller in diameter than it, is secured by an open washer, 20, and a packing washer, 21, which latter snugly fits the recess and prevents any oil or other lubricant from passing beyond it.

This washer 21 forms of the recess two chambers, 14 and 28, from which extend holes 22 23, through the axle to the journal-surface of the box 2. The pipe 18 stops just short of the end of the chamber 14, and is connected by an elbow, 19, with an upright pipe, 27, which is supported at the top by an open washer in the screw-cap 17. In the hole 23 may be placed a loose pin, if desired, to assist in feeding the oil or other lubricant. The oil passes from the reservoir 15, around the pipes 27 and 18, to the hole 23, which passage-way constitutes the primary oiler through which the oil finds its way to the journal-surface of the box 2, to the annular projections 3 5, and the bearing-surfaces of the tube 13 and sleeves 12, the latter being larger internally than the diameter of the axle 1.

Whenever there is an excess of friction resulting from a high rate of speed, or other cause, and the primary oiler does not adequately lubricate the bearings, the oil in the reservoir 15 will be driven by the force of the generated gas directly to the bearings through pipe 18, the gas passing through the hole 23, and forcing the oil out of chamber 28 into reservoir 15, thence down the pipe 27, through the pipe 18, into the chamber 14, and out of the latter through the hole 22, which passage-way constitutes the secondary oiler through which the oil is carried upon the journal-bearing of the box 2, and thence to the other bearings described, thus preventing their becoming too hot.

When the bearings are highly heated the cap 17 may be removed, and a fresh supply of oil poured into the pipe 27, which will convey it directly to the bearing parts, and thereby quickly reduce the heat. This construction thus permits the introduction of fresh oil direct to the heated bearings through the secondary oiler without its having contact with the heated oil contained in the primary oiler.

By my invention the lateral motion of the axle 1 caused by the lateral thrust of the car, is practically provided against, the wheels are permitted to revolve independently of each other and of the axle with a minimum pressure of friction and wear on their bearing-surfaces, and a practical and efficient lubrication is insured.

Having thus described my invention, what I claim as new, and desire to secure by Letters Patent, is—

1. The combination of a stationary axle with wheel having sleeves, and a tube encircling their ends, substantially as described.

2. The combination of a stationary axle with wheels provided with sleeves, a tube encircling their ends, and means for keeping the said tube in position, substantially as described.

3. The combination of a stationary axle, 1, with wheels 11, provided with sleeves 12 and collars 24, and tube 13, with its projecting flange and nut, substantially as described.

4. The sleeves 12, having collars 24, one of which projects beyond the end of the sleeve to which it is secured and overlaps the end of the companion sleeve to break joints, substantially as described.

5. The combination of the box, provided with an annular projection, with the pedestal-support, having an annular projection to resist lateral motion or thrust of the axle, substantially as described.

6. The box 2, having annular projections 3 at each end, and having a groove, 9, substantially as described.

7. The box 2, having annular projection 3, combined with the pedestal-support 4, having annular projection 5, substantially as described.

8. The combination of the pipes 27 18, with their collars 20 21, with the chambers 14 28 and their holes 22 23, substantially as described.

9. A journal-bearing provided with a primary oiler, consisting of a chamber, 28, and hole 23, and with a secondary oiler consisting of a chamber, 14, hole 22, and pipes 18 27, whereby the lubricant may be conveyed directly to the bearing-surfaces without contact with the lubricant contained in the primary oiler, substantially as described.

In testimony whereof I have signed my name to this specification in the presence of two subscribing witnesses.

G. W. MILTIMORE.

Witnesses:
  H. T. MUNSON,
  W. E. REDDING.